(12) United States Patent
Yang et al.

(10) Patent No.: US 11,638,910 B1
(45) Date of Patent: May 2, 2023

(54) LANTHANUM-IRON-LOADED CARBON NANOTUBE FILM FOR ENVIRONMENTAL RESTORATION, PREPARATION AND APPLICATION THEREOF

(71) Applicant: Beijing Normal University, Zhuhai, Zhuhai (CN)

(72) Inventors: Yi Yang, Zhuhai (CN); Yinuo Wang, Puyang (CN); Haowen Lin, Shenzhen (CN); Chenyang Zheng, Shenzhen (CN); Ruikun Xu, Hefei (CN); Huiqi Zhu, Guangzhou (CN); Xuhui Xu, Zhuhai (CN); Lulu Bao, Shenzhen (CN)

(73) Assignee: BEIJING NORMAL UNIVERSITY, ZHUHAI, Zhuhai (CN)

( * ) Notice: Subject to any disclaimer, the term of this patent is extended or adjusted under 35 U.S.C. 154(b) by 0 days.

(21) Appl. No.: 17/973,161

(22) Filed: Oct. 25, 2022

(51) Int. Cl.
| | |
|---|---|
| *B01J 20/20* | (2006.01) |
| *B01J 20/02* | (2006.01) |
| *B01J 20/28* | (2006.01) |
| *B01J 20/32* | (2006.01) |
| *B01J 20/30* | (2006.01) |
| *C02F 101/10* | (2006.01) |
| *C02F 1/28* | (2006.01) |

(52) U.S. Cl.
CPC ......... *B01J 20/205* (2013.01); *B01J 20/0229* (2013.01); *B01J 20/28033* (2013.01); *B01J 20/3021* (2013.01); *B01J 20/3204* (2013.01); *B01J 20/3236* (2013.01); *B01J 20/3293* (2013.01); *C02F 1/281* (2013.01); *C02F 1/283* (2013.01); *C02F 1/288* (2013.01); *C02F 2101/105* (2013.01)

(58) Field of Classification Search
CPC ................. B01J 20/205; B01J 20/0229; B01J 20/28033; B01J 20/3021; B01J 20/3204; B01J 20/3236; B01J 20/3293; B01J 21/185; B01J 23/10; B01J 23/745; B01J 23/83; C02F 1/281; C02F 1/283; C02F 1/288; C02F 2101/105
USPC .............................. 502/5, 182, 185, 303, 338
See application file for complete search history.

(56) References Cited

FOREIGN PATENT DOCUMENTS

| | | | | |
|---|---|---|---|---|
| CN | 101318136 A | * | 12/2008 | .............. B01J 23/83 |
| CN | 104672357 A | * | 6/2015 | ............ C08F 112/08 |
| CN | 113304728 | * | 8/2021 | |
| CN | 113304728 A | | 8/2021 | |
| CN | 113842883 | * | 12/2021 | .............. B01J 20/20 |

OTHER PUBLICATIONS

Dai Shiyu, "Prepration of Lanthanum-Modified Carbon Nanotube Materials and Study On Adsorptive Phosphorus Removal Efficiency", <<China Excellent Doctoral and Master's Thesis Full-text Database (Master) Engineering Science Series I>>, Jun. 2018.
Yang, et al.,"Complete Spin Polarization for a Carbon Nanotube with an Adsorbed Atomic Transition-Metal Chain", NanoLetters, 2004, vol. 4, No. 4, 561-563, Mar. 13, 2004.
Huang, et al., "Enhanced adsorption of phosphate by flower-like mesoporous silica spheres loaded with lanthanum", Microporous and Mesoporous Materials, (217) 2015 225-232, Jul. 2, 2015.
Zhang, et al., "Phosphate adsorption on lanthanum hydroxide-doped activated carbon fiber", Chemical Engineering Journal, 185-186 (2012) 160-167, 2012.
Zhou, et al.,"Phosphorus adsorption on natural sediments: Modeling and effects of pH and sediment composition", Water Research, 39 (2005) 1245-1254, Mar. 13, 2015.
CNIPA, Notification of a First Office Action for CN202111263789.6, dated Apr. 2, 2022.
Beijing Normal University, Zhuhai (Applicant), Reply to Notification of a First Office Action for CN202111263789.6, w/ replacement claims, Jun. 8, 2022.
Beijing Normal University, Zhuhai (Applicant), Supplemental Reply to Notification of a First Office Action for CN202111263789.6, w/ (allowed)replacement claims, Jul. 7, 2022.
CNIPA, Notification to grant patent right for invention in CN202111263789.6, dated Jul. 20, 2022.

* cited by examiner

*Primary Examiner* — Patricia L. Hailey
(74) *Attorney, Agent, or Firm* — Zhigang Ma

(57) ABSTRACT

A preparation method of a lanthanum-iron-loaded carbon nanotube film for environmental restoration is provided, it belongs to the technical field of composite materials. The preparation method includes: mixing carbon nanotubes with a lanthanum-iron mixed solution to obtain a suspension, then obtaining a first reaction solution by a constant temperature oscillation reaction; adding alkali liquor into the first reaction solution to obtain a second reaction solution by an oscillation reaction; carrying out a solid-liquid separation on the second reaction solution, adding the obtained solid after drying into an organic solution, and obtaining a third reaction solution by ultrasonic mixing; centrifuging the third reaction solution to obtain a supernatant; obtaining a lanthanum-iron-loaded carbon nanotube film by suction filtration. Compared with powdered adsorbent and single adsorbent, the material prepared by the preparation method has advantages of strong stability, high adsorption efficiency, good regeneration effect, high recycling efficiency, and low production.

1 Claim, No Drawings

LANTHANUM-IRON-LOADED CARBON NANOTUBE FILM FOR ENVIRONMENTAL RESTORATION, PREPARATION AND APPLICATION THEREOF

TECHNICAL FIELD

The disclosure relates to the technical field of composite materials, in particular to a lanthanum-iron-loaded carbon nanotube film for environmental restoration, preparation and application thereof.

BACKGROUND

Water is an important resource for all life. The rapid development of industrial and agricultural production activities and urbanization has a huge impact on water resources. The aggravation of water pollution is a major threat to human survival and safety and becomes a major obstacle to human health and the sustainable development of socioeconomics. Phosphorus element, especially phosphate which is a key factor leading to water eutrophication (Zhou, et al. Water Res. 2005, 39 (7): 1245-1254.). Phosphate is an essential nutrient for algae. When the content of phosphate in water is too high, a large number of aquatic plants and other bacteria propagate rapidly, which results in lower transparency of water, less dissolved oxygen and eutrophication, and leads to the death of aquatic animals such as fish due to hypoxia. At the same time, it will increase the reproduction of anaerobic bacteria in the water, produce toxic substances, and seriously damage the aquatic ecosystem. Water eutrophication mainly occurs in freshwater bodies, and the deterioration of water quality may affect the water supply of residents, which will seriously threaten the safety of drinking water. At present, freshwater resources are scarce. The emergence of the water eutrophication further aggravates the severe situation of water supply shortage and significantly affects the normal social production and lives of residents. For the above reasons, it is of great practical importance for ecological protection, economic development and social progress to efficiently purify phosphorus-containing wastewater, adopt economical and effective technical means to remediate phosphorus-polluted water bodies and avoid eutrophication.

Adsorption is the most commonly used method for the restoration of phosphorus-polluted water, and the selection to adsorbents is a very critical factor. The rare earth element lanthanum is an element with abundant content in nature, and most of lanthanum compounds have no pollution to the environment. Many studies have shown that the lanthanum compounds including lanthanum carbonate, lanthanum hydroxide, lanthanum oxide and so on have strong binding ability to phosphate. At the same time, iron salts have also been widely used as an adsorbent, which plays an important role in modern wastewater treatment. The iron salts can be used to prevent the emission of hydrogen sulfide in the process of anaerobic nitrification, and they can be used as a coagulant for sewage treatment. In addition, the iron salts can also be used as an adsorbent with high adsorption performance for phosphate in production. In terms of economic benefits, the iron salts are substances with similar adsorption performance to aluminum salts but much lower cost. With the continuous development of modern technological means, nanotechnology has been widely used in the degradation of pollutants in water bodies and in-situ environmental restoration. Among them, the applications of nano-iron and nano-lanthanum materials are high-profile. However, most of the lanthanum-based materials are in the powder form, and their particle sizes are too small, which are easy to agglomerate and difficult to be recycled after the phosphorus removal. After adsorption of iron salts, there is a problem that the iron salts are also difficult to be recycled. If the iron salts after the adsorption are discharged directly into the environment, they will pollute the water and easily corrode the drainage facilities, instruments and meters, which also limits their actual uses in a certain. These shortcomings have significantly increased the cost on treatment of wastewater containing phosphorus, and thus the large-scale applications of the iron salts and the lanthanum-based materials are difficult to realize.

To sum up, lanthanum compounds have excellent adsorption performance for the phosphate, but the cost of them is higher than the iron salts, and they have the characteristics of small particle size, easy agglomeration and difficult recycling. The iron salts can also be used as an efficient adsorbent to remove the phosphate and the cost of iron salts is cheaper. However, the iron salts are easy to leach after reactions when they are used alone, and they will cause corrosion to drainage equipment and more likely affect water quality. The use of lanthanum-iron dual adsorption can not only reduce the leaching of iron salt by the use of lanthanum, but also reduce the cost of adsorbents in certain. The use of lanthanum-iron dual adsorption further gives full play to the excellent performance of both metallic species, achieves the purpose of efficient adsorption and greatly increases the possibility to apply the lanthanum-iron dual adsorption for practical use.

However, both iron catalysts and lanthanum catalysts have the disadvantages of easy agglomeration, difficult recycling and high cost, which greatly limits the practical application of the two catalysts having excellent performance. In order to solve these problems, researchers have proposed an idea of loading iron compounds and lanthanum compounds on different carriers uniformly, which can increase the mechanical strength and avoid agglomeration while increasing the contact efficiency between the adsorbent and the pollutants in the water. At the same time, these compounds are easy to be separated from the pollutants, which improves the recycling efficiency and reduce the loss of nano-compounds. Huang et al. (Huang, et al. Micropor Mesopor Mat. 2015, 217:225-232.) prepared a new type of lanthanum loaded flower-like mesoporous silica (FMS La) and applied it to the adsorption of phosphate. Narrow internal channels and open external channels of the flower-like mesoporous silica make its internal and external surfaces available for adsorbing pollutants. Although the flower-like mesoporous silica has good adsorption performance, its application is limited due to the complex preparation process. Zhang et al. (Zhang, et al. Chem Eng J, 2012, 185-186 (6): 160-167.) mixed lanthanum (III) and iron (III) (also referred to trivalent lanthanum and trivalent iron) to prepare composite metal oxide or composite metal hydroxide, and the composite metal oxide or composite metal hydroxide is doped with activated carbon fiber (ACF) to obtain a new adsorbent: ACF-lanthanum (La) ferrum (Fe). It was found that ACF-La Fe has a good effect on phosphorus removal when it is used to adsorb phosphate. But the ACF also has the disadvantages of easy agglomeration and difficult recycling. The research team of Yang (Yang, et al. Nano Lett. 2004, 4 (4): 561-563.) found that there is a strong interaction between the transition metal and the carbon atoms on the surface of metal-loaded carbon nanotubes, which can improve the adsorption performance of the catalysts. Carbon nanotubes can have a strong interaction with pollutant molecules in an adsorption process. The carbon nanotubes are often used as an adsorbent to remove various impurities in gas pollutants and aqueous solutions and are a kind of carrier material with excellent performance. Additionally, the carbon nanotubes are commonly used as adsorbent carriers with advantages of hollow interior, numerous pores and large specific surface area, but they also have disadvantages of easy aggregation, difficult recycling and high cost.

Therefore, how to prepare an adsorbent for environmental restoration with high stability, cost-effective and excellent environmental tolerance is a problem that people need to solve.

SUMMARY

A purpose of the disclosure is to provide a lanthanum-iron-loaded carbon nanotube film for environmental restoration, preparation and application thereof. In order to solve the problems in the prior art, the disclosure uses a wet immersion method and a suction filtration method to modify carbon nanotubes for preparing lanthanum-iron-loaded carbon nanotubes, and then the lanthanum-iron-loaded carbon nanotubes are formed into a film, which can respectively give play to the advantages of good adsorption efficiency of nanoscale lanthanum-iron compounds (also referred to nano-iron compounds and nano-lanthanum compounds) at the same time. And the carbon nanotubes can obtain better adsorption capacity than loading the nanoscale lanthanum-iron compounds on the carbon nanotubes respectively, and the lanthanum-iron-loaded carbon nanotubes have good stability after being formed into the film. The lanthanum-iron-loaded carbon nanotubes also have advantages such as large specific surface area and easy recycling, which improves the treatment and regeneration efficiency of environmental restoration agent.

In order to achieve the above purpose, the disclosure provides a following technical solution:

(1) mixing carbon nanotubes with a lanthanum-iron mixed solution (also referred to a mixed solution consisting of a solution of lanthanum compounds and a solution of iron compounds) to obtain a suspension, then obtaining a first reaction solution by carrying out a constant temperature oscillation reaction on the suspension;

(2) adding alkali liquor into the first reaction solution to obtain a mixture, then obtaining a second reaction solution by carrying out an oscillation reaction on the mixture;

(3) carrying out a solid-liquid separation on the second reaction solution to obtain a solid, drying the solid, adding the dried solid into an organic solution, then obtaining a third reaction solution by carrying out ultrasonic mixing on the organic solution and the dried solid;

(4) centrifuging the third reaction solution to obtain a supernatant;

(5) carrying out suction filtration on the supernatant through a mixed fiber membrane to obtain the lanthanum-iron-loaded carbon nanotube film for environmental restoration.

In an embodiment, in the step (1), the lanthanum-iron mixed solution is a mixed solution of lanthanum nitrate and ferric nitrate; a molar ratio of lanthanum:iron in the mixed solution of lanthanum nitrate and ferric nitrate is 1~2:1, and concentrations of lanthanum nitrate and ferric nitrate in the mixed solution of lanthanum nitrate and ferric nitrate are in a range of 0.005~0.01 mole per liter (mol/L); a mass ratio of total elemental mass of the lanthanum and the iron:added mass of the carbon nanotubes is 0.3~1:1.

In an embodiment, in the step (1), a temperature of the constant temperature oscillation reaction is 20~30 Celsius degrees (° C.), time for the constant temperature oscillation reaction is 2~8 hours (h).

In an embodiment, in the step (2), the alkali liquor is one of potassium hydroxide solution, sodium hydroxide solution, and calcium hydroxide solution with a concentration of 0.5~2 mol/L; an added amount of the alkali liquor makes a concentration of alkali in the second reaction solution to be 0.1 mol/L.

In an embodiment, in the step (2), the oscillation reaction is carried out with a speed of 150~250 revolutions per minute (rpm) for 20~50 minutes (min).

In an embodiment, in the step (3), the organic solution may be a sodium dodecyl sulfate solution with a concentration of 0.05~0.2 mol/L; a temperature of drying the solid is −20° C., and time for drying the solid is 10~20 h; time for the ultrasonic mixing is 40~80 min.

The disclosure further provides a lanthanum-iron-loaded carbon nanotube film for environmental restoration prepared by the preparation of a lanthanum-iron-loaded carbon nanotube film for environmental restoration.

The disclosure further provides an application of the lanthanum-iron-loaded carbon nanotube film for environmental restoration, in particular to removal of phosphate in water.

By loading lanthanum and iron as a form of hydroxide onto the carbon nanotubes, the disclosure can obtain a lanthanum-iron-loaded carbon nanotube film after suction filtration, which can solve problems such as small particle size of nano-lanthanum compounds, easy agglomeration, difficult recycling, loss of nanoscale lanthanum-iron compounds and high cost. The lanthanum-iron-loaded carbon nanotube film prepared by the disclosure can respectively give play to good adsorption efficiency of nanoscale lanthanum-iron compounds at the same time and give play to the advantages of the carbon nanotube film such as large specific surface area, high stability, and numerous pores, which greatly improves adsorption of the carbon nanotube film on pollutants in water.

As a kind of nanomaterial, the sizes of powdered carbon nanotubes are too small, and the powdered carbon nanotubes are difficult to complete solid-liquid separation after adsorbing pollutants. For the subsequent treatment of powdered materials, the main solid-liquid separation methods include centrifugation method and filtration method at present. The separation of the carbon nanotubes by centrifugation usually requires extremely high speed and high energy consumption. A traditional filtration method used in the past is easy to produce problems such as membrane pore blockage while filtering and separating the carbon nanotubes, and the separation effect is not good. The two methods can not realize a good separation effect. But in the disclosure, the carbon nanotubes are formed into a macroscopic solid film before applied, which improves recycling and regeneration efficiency and the adsorption performance at the same time. The recycling and the regeneration efficiency of the carbon nanotubes are more than 90% after used, and the carbon nanotubes film has good performances and effects.

The disclosure discloses following technical effects.

1. The disclosure provides preparation of a lanthanum-iron-loaded carbon nanotube film for environmental restoration, and a wet immersion method is used in the disclosure to make lanthanum-iron compounds uniformly dispersed and loaded on carbon nanotubes, then a film is obtained by suction filtration. The preparation is simple. The adsorbent can give play to good adsorption efficiency of nanoscale lanthanum-iron compounds, and obtain stronger adsorption capacity than loading the nanoscale lanthanum-iron compounds on the carbon nanotubes respectively.

2. The nanoscale lanthanum-iron compounds used in the disclosure are loaded on the carbon nanotubes having high stability, large specific surface area and numerous pores, then the film is formed by the suction filtration, which can reduce the difficulty of separation process after used and reduce the operation cost and improve the recycling efficiency while increasing the adsorption performance.

3. The lanthanum-iron-loaded carbon nanotube film used in the disclosure is a renewable material, the adsorption efficiency is high after regeneration, the regeneration process is simple and easy to operate, the time cost is greatly saved, the economic benefit is improved, and the application is convenient for production and life.

Compared with the prior art, the disclosure has following advantages.

(1) The product has stable quality, excellent effect, simple preparation and good industrial application value.

(2) The renewable material disclosed by the disclosure has the advantages of nanoscale lanthanum-iron compounds and the carbon nanotubes and gives play to the advantages of good adsorption efficiency of the nanoscale lanthanum-iron compounds and high stability, large specific surface area and numerous pores of the carbon nanotubes.

(3) The renewable material of the disclosure loads the nanoscale lanthanum-iron compounds onto the carbon nanotubes, then a film is formed by suction filtration, which fully uses the advantages of the large specific surface area of the carbon nanotubes, thus improving the adsorption efficiency to pollutants.

(4) The lanthanum-iron-loaded carbon nanotube film disclosed by the disclosure avoids agglomeration and is easy to be separated and regenerated, which improves the recycling efficiency and reduces the loss of lanthanum-iron compounds and reduces the production cost.

DETAILED DESCRIPTION OF EMBODIMENTS

Various exemplary embodiments of the disclosure will be described in detail now. The detailed description should not be taken to be a limit of the disclosure, but should be taken as a more detailed description of certain aspects, features, and embodiments of the disclosure.

It is to be understood that the terms used herein are only for the purpose of describing specific embodiments and are not intended to be limit of the disclosure. In addition, for numerical ranges in the disclosure, it should be understood that each intermediate value between the upper and lower limits of the range are also specifically disclosed. The each intermediate value within any stated value or range and every lesser range between any other stated value or intermediate value within a stated range is also encompassed within the disclosure. Upper and lower limits of the lesser ranges may be independently included or excluded from the range.

Unless otherwise indicated, all technical and scientific terms used herein have the same meaning as commonly understood by those ordinary skilled in the art which the disclosure belongs. While only the preferred methods and materials have been described herein, any methods and materials similar or equivalent to those described herein can be used in the practice or testing of the present invention. All documents mentioned in the specification are incorporated by reference for the purpose of disclosing and describing the methods and/or materials associated with the documents. In the event of a conflict with any incorporated documents, the contents of the specification shall prevail.

It is obvious to those skilled in the art that various modifications and variations can be made in the specific embodiments described herein without departing from the scope or spirit of the specification of the disclosure. Other embodiments are obvious those skilled in the art from the specification of the disclosure. The specification and embodiments of the disclosure are exemplary only.

The words "include", "have", "contain", "comprise", etc. used in the article are all open words, and the words mean including but not limited to this.

Embodiment 1

Preparation for a lanthanum-iron-loaded carbon nanotube film, including following steps.

(1) Preparation for a mixed solution of lanthanum nitrate and ferric nitrate:

(1-1) weighing 0.6495 g (0.0015 mol) of lanthanum nitrate hexahydrate solid and 0.363 g (0.0015 mol) of ferric nitrate solid to dissolve in 200 milliliter (mL) of deionized water, and stirring with a glass rod until the lanthanum nitrate hexahydrate solid and the ferric nitrate solid are completely dissolved to obtain the mixed solution of lanthanum nitrate and ferric nitrate.

(2) Preparation for a mixed solution of lanthanum iron carbon nanotubes:

(2-1) adding 0.975 g of carbon nanotubes into the mixed solution of lanthanum nitrate and ferric nitrate to obtain a suspension, and oscillating the suspension in a thermostatic oscillator at a temperature of 25° C. and a speed of 200 rpm for 4 h to fully mix the carbon nanotubes and the mixed solution of lanthanum nitrate and ferric nitrate to obtain a mixed suspension;

(2-2) adding 22.22 mL of a sodium hydroxide solution with a concentration of 1 mol/L into the mixed suspension to obtain a mixed system, and thereby to make a concentration of sodium hydroxide in the mixed system be 0.1 mol/L, oscillating the mixed system in an oscillator at a speed of 200 rpm for 30 min to fully fix lanthanum and iron elements loaded on the carbon nanotubes.

(3) Preparation for the lanthanum-iron-loaded carbon nanotube film:

(3-1) filtering a product obtained in step (2) to obtain a solid, lyophilizing the solid in an oven at a temperature of −20° C. for 12 h, and then grinding the solid to obtain a powder;

(3-2) adding the powder into 800 mL of a sodium dodecyl sulfate solution with a concentration of 0.1 mol/L, then carrying out ultrasonic mixing on the powder and the sodium dodecyl sulfate solution for 1 h to obtain an ultrasonic mixed solution;

(3-3) putting the ultrasonic mixed solution into a centrifuge to perform centrifugal treatment at a speed of 3000 rpm for 30 min;

(3-4) obtaining a supernatant after the centrifugal treatment, and carrying out suction filtration on the supernatant through a mixed fiber membrane with a pore diameter of 0.45 micrometer (μm) to obtain the lanthanum-iron-loaded carbon nanotube film.

A performance test for the lanthanum-iron-loaded carbon nanotube film.

Putting the lanthanum-iron-loaded carbon nanotube film having a concentration of 1 g/L prepared in the embodiment in 200 mL and 100 mg/L phosphate solution for adsorption for 6 h. An initial potential of hydrogen (pH) of the phosphate solution is 7. The adsorption reaction is carried out in a thermostatic oscillator at 25° C. and 150 rpm. After the reaction, a remaining solution pH is 7.54, adsorption capacity of the lanthanum-iron-loaded carbon nanotube film for phosphorus is 97 mg/g, and adsorption efficiency of the lanthanum-iron-loaded carbon nanotube film for phosphorus is 97%.

Embodiment 2

Preparation for a lanthanum-iron-loaded carbon nanotube film, including following steps.

(1) Preparation for a mixed solution of lanthanum nitrate and ferric nitrate:

(1-1) weighing 0.866 g (0.002 mol) of lanthanum nitrate hexahydrate solid and 0.242 g (0.001 mol) of ferric nitrate solid to dissolve in 200 milliliter (mL) of deionized water, and stirring with a glass rod until the lanthanum nitrate hexahydrate solid and the ferric nitrate solid are completely dissolved to obtain the mixed solution of lanthanum nitrate and ferric nitrate.

(2) Preparation for a mixed solution of lanthanum iron carbon nanotubes:

(2-1) adding 1.113 g of carbon nanotubes into the mixed solution of lanthanum nitrate and ferric nitrate to obtain a suspension, and oscillating the suspension in a thermostatic oscillator at a temperature of 25° C. and a speed of 200 rpm for 4 h to fully mix the carbon nanotubes and the mixed solution of lanthanum nitrate and ferric nitrate to obtain a mixed suspension;

(2-2) adding 22.22 mL of a sodium hydroxide solution with a concentration of 1 mol/L into the mixed suspension to obtain a mixed system, and thereby to make a concentration of sodium hydroxide in the mixed system be 0.1 mol/L, oscillating the mixed system in an oscillator at a speed of 200 rpm for 30 min to fully fix lanthanum and iron elements loaded on the carbon nanotubes.

(3) Preparation for the lanthanum-iron-loaded carbon nanotube film:

(3-1) filtering a product obtained in step (2) to obtain a solid, lyophilizing the solid in an oven at a temperature of −20° C. for 12 h, and then grinding the solid to obtain a powder;

(3-2) adding the powder into 800 mL of a sodium dodecyl sulfate solution with a concentration of 0.1 mol/L, then carrying out ultrasonic mixing on the powder and the sodium dodecyl sulfate solution for 1 h to obtain an ultrasonic mixed solution;

(3-3) putting the ultrasonic mixed solution into a centrifuge to perform centrifugal treatment at a speed of 3000 rpm for 30 min;

(3-4) obtaining a supernatant after the centrifugal treatment, and carrying out suction filtration on the supernatant through a mixed fiber membrane with a pore diameter of 0.45 μm to obtain the lanthanum-iron-loaded carbon nanotube film.

A performance test for the lanthanum-iron-loaded carbon nanotube film.

Putting the lanthanum-iron-loaded carbon nanotube film having a concentration of 1 g/L prepared in the embodiment in a 200 mL phosphate solution. Adjusting an initial pH of the phosphate solution to carry out an adsorption reaction on the phosphate solution, time for the adsorption reaction is 6 h. The result shows that the lanthanum-iron-loaded carbon nanotube film has good adsorption performance under acidic conditions. When the substrate phosphorus concentration (also referred to a concentration of the phosphorus element in the phosphate solution) is 150 mg-P/L, adsorption capacity of the lanthanum-iron-loaded carbon nanotube film for phosphorus is 148 mg/g, and adsorption efficiency of the lanthanum-iron-loaded carbon nanotube film for phosphorus is 99%.

Embodiment 3

Preparation for a lanthanum-iron-loaded carbon nanotube film, including following steps.

(1) Preparation for a mixed solution of lanthanum nitrate and ferric nitrate:

(1-1) weighing 1.229 g (0.003 mol) of lanthanum nitrate hexahydrate solid and 0.762 g (0.003 mol) of ferric nitrate solid to dissolve in 400 mL of deionized water, and stirring with a glass rod until the lanthanum nitrate hexahydrate solid and the ferric nitrate solid are completely dissolved to obtain the mixed solution of lanthanum nitrate and ferric nitrate.

(2) Preparation for a mixed solution of lanthanum iron carbon nanotubes:

(2-1) adding 0.975 g of carbon nanotubes into the mixed solution of lanthanum nitrate and ferric nitrate to obtain a suspension, and oscillating the suspension in a thermostatic oscillator at a temperature of 25° C. and a speed of 200 rpm for 4 h to fully mix the carbon nanotubes and the mixed solution of lanthanum nitrate and ferric nitrate to obtain a mixed suspension;

(2-2) adding 44.44 mL of a sodium hydroxide solution with a concentration of 1 mol/L into the mixed suspension to obtain a mixed system, and thereby to make a concentration of sodium hydroxide in the mixed system be 0.1 mol/L, oscillating the mixed system in an oscillator at a speed of 200 rpm for 30 min to fully fix lanthanum and iron elements loaded on the carbon nanotubes.

(3) Preparation for the lanthanum-iron-loaded carbon nanotube film:

(3-1) filtering a product obtained in step (2) to obtain a solid, lyophilizing the solid in an oven at a temperature of −20° C. for 12 h, and then grinding the solid to obtain a powder;

(3-2) adding the powder into 800 mL of a sodium dodecyl sulfate solution with a concentration of 0.1 mol/L, then carrying out ultrasonic mixing on the powder and the sodium dodecyl sulfate solution for 1 h to obtain an ultrasonic mixed solution;

(3-3) putting the ultrasonic mixed solution into a centrifuge to perform centrifugal treatment at a speed of 3000 rpm for 30 min;

(3-4) obtaining a supernatant after the centrifugal treatment, and carrying out suction filtration on the supernatant through a mixed fiber membrane with a pore diameter of 0.45 μm to obtain the lanthanum-iron-loaded carbon nanotube film.

A performance test for the lanthanum-iron-loaded carbon nanotube film.

Putting the lanthanum-iron-loaded carbon nanotube film having a concentration of 1 g/L prepared in the embodiment in 200 mL and 100 mg/L phosphate solution for adsorption for 6 h. An initial pH of the phosphate solution is 5.52. The adsorption reaction is carried out in a thermostatic oscillator at a temperature of 25° C. with a speed of 150 rpm. After the reaction, adsorption capacity of the lanthanum-iron-loaded carbon nanotube film for phosphorus is 94 mg/g, and adsorption efficiency of the lanthanum-iron-loaded carbon nanotube film for phosphorus is 94%.

The above described embodiments only describe some embodiments of the disclosure, but not limit the scope of the disclosure. Based on the design spirit of the disclosure, all changes and improvements made by those skilled in the art to the technical solution of the disclosure should fall within the scope of protection defined in the claims of the disclosure.

What is claimed is:

1. A preparation method of a lanthanum-iron-loaded carbon nanotube film for environmental restoration, comprising the following steps:
   (1) preparation for a mixed solution of lanthanum nitrate and ferric nitrate:
   weighing 0.002 mole (mol) of lanthanum nitrate hexahydrate solid and 0.001 mol of ferric nitrate solid to dissolve in 200 milliliter (mL) of deionized water, and stirring with a glass rod until the lanthanum nitrate hexahydrate solid and the ferric nitrate solid are completely dissolved to obtain the mixed solution of lanthanum nitrate and ferric nitrate;
   (2) preparation for a mixed solution of lanthanum iron carbon nanotubes:
   (2-1) adding 1.113 grains (g) of carbon nanotubes into the mixed solution of lanthanum nitrate and ferric nitrate to obtain a suspension, and oscillating the suspension in a thermostatic oscillator at a temperature of 25 Celsius degrees (° C.) and a speed of 200 revolutions per minute (rpm) for 4 hours (h) to mix the carbon nanotubes and the mixed solution of lanthanum nitrate and ferric nitrate to obtain a mixed suspension;
   (2-2) adding 22.22 mL of a sodium hydroxide solution with a concentration of 1 mole per liter (mol/L) into the mixed suspension to obtain a mixed system, and thereby to make a concentration of sodium hydroxide in the mixed system be 0.1 mol/L, oscillating the mixed system in an oscillator at a speed of 200 rpm for 30 minutes (min) to fix lanthanum and iron elements loaded on the carbon nanotubes;
   (3) preparation for the lanthanum-iron-loaded carbon nanotube film:
   (3-1) filtering a product obtained in step (2) to obtain a solid, lyophilizing the solid in an oven at a temperature of −20° C. for 12 h, and then grinding the solid to obtain a powder;
   (3-2) adding the powder into 800 mL of a sodium dodecyl sulfate solution with a concentration of 0.1 mol/L, then carrying out ultrasonic mixing on the powder and the sodium dodecyl sulfate solution for 1 h to obtain an ultrasonic mixed solution;
   (3-3) putting the ultrasonic mixed solution into a centrifuge to perform centrifugal treatment at a speed of 3000 rpm for 30 min;
   (3-4) obtaining a supernatant after the centrifugal treatment, and carrying out suction filtration on the supernatant through a mixed fiber membrane with a pore diameter of 0.45 micrometers (μm) to obtain the lanthanum-iron-loaded carbon nanotube film.

\* \* \* \* \*